(12) United States Patent
Reiners et al.

(10) Patent No.: US 7,070,852 B1
(45) Date of Patent: Jul. 4, 2006

(54) PACKAGING MATERIAL WITH A FOAMED POLYOLEFIN LAYER

(75) Inventors: Ulrich Reiners, Venray (NL); Michel Pittet, Billens (CH)

(73) Assignee: Covenience Food Systems B.V., Bakel (NL)

( * ) Notice: Subject to any disclaimer, the term of this patent is extended or adjusted under 35 U.S.C. 154(b) by 765 days.

(21) Appl. No.: 09/763,679

(22) PCT Filed: Aug. 24, 1999

(86) PCT No.: PCT/EP99/06191

§ 371 (c)(1),
(2), (4) Date: May 15, 2001

(87) PCT Pub. No.: WO00/13886

PCT Pub. Date: Mar. 16, 2000

(30) Foreign Application Priority Data

Sep. 2, 1998 (DE) .............................. 198 40 046

(51) Int. Cl.
*B32B 3/26* (2006.01)
*B32B 7/12* (2006.01)
*B32B 9/00* (2006.01)

(52) U.S. Cl. .............................. 428/304.4; 428/317.7; 428/318.4; 428/318.6; 428/319.7

(58) Field of Classification Search ............ 428/304.4, 428/317.7, 318.6, 319.7, 318.4
See application file for complete search history.

(56) References Cited

U.S. PATENT DOCUMENTS 6,132,539 A  10/2000  Laurent et al. ............... 156/78

FOREIGN PATENT DOCUMENTS

| DE | 37 22 139 A1 | 1/1989 |
| EP | 0 570 222 | 11/1993 |
| EP | 0 570 222 A1 | 11/1993 |
| WO | 96 25290 | 8/1996 |
| WO | WO 96/25290 | 8/1996 |

OTHER PUBLICATIONS

Derwent Abstract for DE 3722 139 entitled "Thermoplastic Foamed Film Partic. For Carrier Bags, etc. by Extruding in at Least 2 Layers, one Contg, Blowing Agent and One Contg. No Blowing Agent", Patent Assignee: Stoll Kunststoffe.

*Primary Examiner*—Victor Cheng
(74) *Attorney, Agent, or Firm*—Norris McLaughlin & Marcus PA

(57) ABSTRACT

The invention relates to a multilayer film comprising the following sequence of layers:
A) a basis layer of polyolefin foam,
B) a layer based on at least one of the polyolefins of the foam layer A),
C) optionally a tie layer based on a polyolefin,
D) optionally an adhesive layer,
E) optionally a gas- and/or flavortight barrier layer,
F) an adhesive layer,
G) an optionally sealable and/or peelable surface layer, whereby the total thickness of layers A) and B) ranges from 0.5 to 2 mm and the thickness of layer B) ranges from ⅙ to ½ of the thickness of layer A).

20 Claims, No Drawings

PACKAGING MATERIAL WITH A FOAMED POLYOLEFIN LAYER

This is a 371 of PCT/EP99/06191 filed 24 Aug. 1999 (international filing date).

The invention is in the field of packaging industry and relates to packaging material comprising a polyolefin foam layer having on one of its surfaces further layers.

BACKGROUND OF THE INVENTION

Packaging materials with a foam layer of e.g. polypropylene in the form of quasi endless rolled webs are used for producing thermoformed self-supporting packaging items as e.g. trays for food. Therefore these kinds of packaging materials are formed on so called "form-fill-seal" packaging machines ("FFS-machines") to packaging items. According to this method the web of packaging material is fed into the machine in which it is formed into a web of trays which trays in the same machine are filled and sealed with a preferable transparent sealing film. Then usually the trays are separated from each other.

In the known packaging materials the polypropylene foam layer is carrying on at least one of its surfaces further layers. Depending on the composition and the thickness of these layers these layers may also serve as further means for increasing the stiffness as well as protection of the foam layer surface or as gas and/or aroma barrier and/or as surface layer for bounding the packaging tray and a preferable transparent lidding film.

Packaging materials with a polypropylene foam layer for producing trays by thermoforming are disclosed e.g. in EP-A-0 570 222. These materials comprise a foam layer and a multilayer film which multilayer film may include a barrier layer rendering the packaging material gas- and/or aroma tight. The properties of this multilayer packaging material need some improvement as far as the use of this material as self-supporting packaging items is concerned.

Therefore it is has been proposed to bond the foam sheet with the multilayer film by means of a bonding layer of a polyolefin based on the main monomer of the polyolefin of the foam layer (WO 96/25290). This results in an excellent adhesion between the laminate and the foam layer. However the packaging items especially self-supporting ones produced from this known multilayer film composition are not rigid enough for some applications.

Therefore there is a need to improve the stiffness of such packaging items, preferably trays, without increasing the thickness of the packaging material. Besides improving the mechanical properties of the packaging material there is also a demand to provide a packaging material suitable for thermoforming over a broader temperature range in order to achieve a faster production of packaging items.

SUMMARY OF THE INVENTION

According to the present invention, this object is achieved by providing a multilayer film comprising the following sequence of layers:
A) a base layer of a polyolefin foam,
B) a layer based on at least one polyolefin of the foam layer A),
C) optionally a tie layer composed of a polyolefin, which is preferably based on the monomer that is the main monomer of the polyolefin of the foam layer A),
D) optionally an adhesive layer,
E) optionally a gas- and/or flavortight barrier layer,
F) an adhesive layer,
G) an optionally sealable and/or peelable surface layer, whereby the total thickness of layers A) and B) ranges from 0.5 to 2 mm and the thickness of layer B) ranges from ⅙ to ½ of the thickness of layer A).

DETAILED DESCRIPTION

Preferably the total thickness of the layers A) and B) ranges from 0.6 to 1.4 mm and the thickness of layer B) is from ⅙ to ⅓ of the thickness of layer A).

The foam layer A) consists of at least one foamed polyolefin. For producing packaging items such as trays applicable in food packaging foamed propylene- homo- and/or -copolymers are used advantageously as such materials are self-supporting with lower thickness and lower density. A mixture of polyolefins can also be used for the manufacture of the foam layer. A mixture of polypropylene with long chain branching (high-melt-strength polypropylene) and a propylene ethylene copolymer (e.g. heterophasic propylene ethylene blockcopolymer) can preferably be used. Particularly suitable is a mixture of a polypropylene with long chain branching and a melt-index (MFI) in the range of 1.4 to 4.2 g/10 min and a heterophasic propylene ethylene block copolymer in a mixing ratio of 1:1.

The polyolefin of layer A) can be foamed by addition of solid, liquid and/or gaseous blowing agents in known amounts preferable in an amount of 0.5 to 3 wt. %. The relevant disclosure of EP-A-0 570 222 is herewith cited as referential disclosure for the present application.

Foam layers of polyolefins, preferable of polypropylene, optionally admixed with copolymers of olefins, preferable with propylene ethylene copolymers, used for the production of packaging materials preferably have a density of 0.1 to 0.8 g/cm$^3$, preferably 0.25 to 0.5 g/cm$^3$, and a cell count of 75 to 300 cells per mm$^3$. Density and cell count can be influenced by the process conditions like, e.g., extrusion temperature or other process condition during the preferred method for producing foam layers, namely by extrusion and expansion.

Layer B) of compact polyolefin essentially consists of a polyolefin of the foamed layer A). In case the basis layer A) is made of a foamed polypropylene or a foamed mixture of polypropylene and propylene ethylene copolymer the compact polyolefin layer B) is preferably made either of polypropylene or a propylene ethylene copolymer. Particularly preferred a heterophasic propylene ethylene blockcopolymer is used. The melt index (MFI) of the polyolefin used for the manufacture of layer B) ranges preferably from 1.8 to 5.5 g/10 min. The thickness of layer B) is ⅙ to ½, most preferably ⅙ to ⅓ of the thickness of layer A).

Layer C) is present when layers D) to G) are pre-produced by coextrusion preferable by blown film coextrusion and to be combined with the other layers. Layer C) is based on a polyolefin which is preferably made from a monomer which is also the main monomer of the polyolefin of the foam layer A). In case layer A) consists of a foamed polypropylene and optionally a propylene ethylene copolymer, layer C) can be made of polypropylene optionally grafted with maleic acid anhydride. Copolymers of ethylene vinylacetate can also be used as materials for layers C). The thickness of layer C) ranges preferably from 5 to 25, most preferably from 8 to 15 μm.

In case the inventive multilayer film should have a low gas permeability, i.e. a low permeability of oxygen and moisture and a high flavor tightness it comprises a barrier layer E). This barrier layer is preferably made of ethylene vinyl alcohol copolymer having an ethylene content of 32 to 45 Mol %, preferably 35 to 42 Mol %.

The barrier layer E) is bonded on its respective surfaces to the tie layer C) or to the surface protecting layer G) by means of an adhesive layer D) or F), respectively. The material used for this is preferably a propylene copolymer or a polyethylene grafted with maleic acid anhydride, respectively.

The surface protecting layer G) is preferably sealable or peelable. Thus, preferably low density polyethylene (LDPE) having a melt index (MFI) in the range of 0.5 to 8.0 g/10 min, preferably of 1 to 5 g/10 min (2.16 kg, 190° C. measured according to ASTM D 1238) or a ionomer polymer like, e.g., a copolymer of an α-olefin and an ethylenically unsatured monomer with a carboxylic group, which are present in an amount of 20 to 100% by weight as metal salt, preferably Zn-salt; or ethylene-vinylacetate copolymers with a vinylacetate content of 3 to 10% by weight, preferably 4 to 6% by weight is used for the manufacture of the sealable layer.

According to a particularly preferred embodiment the sealing layer is also peelable. The sealing layer then preferably comprises a mixture of LDPE and polybutylene (PB). To this end the mixture comprises 15 to 30 weight %, preferably 20 to 28 weight % of polybutylene. The melt index (MFI) of the polybutylene is preferably in the range of 0.3 to 2.0 g/10 min (190° C. and 2.16 kg, ASTM 1238).

Preferably the thickness of the surface layer is in the range of 10 to 50 µm, preferably 15 to 30 µm.

When using LDPE as a sealing layer material and the inventive multilayer film comprises a barrier layer, usually an adhesive layer is required for connecting the barrier layer and the sealing layer, unless ethylene vinyl alcohol is used as material for the barrier layer. As adhesive material a polyolefin, preferably a polyethylene grafted with maleic acid anhydride may be used.

A LDPE and LLDPE mixture can also be used in a ratio from 3:1 to 4:1 as adhesive material. The thickness of the respective adhesive layer ranges from 2 to 8 µm, preferably from 3 to 6 µm.

The surface layer G) may contain usual and known lubricating agents and anti-blocking agents, as, for example, erucic acid amide, polyalkylsiloxane, such as for example polydimethyl siloxane and/or $SiO_2$. All or individual layers can contain stabilizers and further additives of known kind.

Furthermore layer B) can contain 0.5 to 2% by weight of a white pigment like, e.g., kaolin, calcium carbonate, talcum or titanium dioxide or mixtures thereof. These inorganic pigments are added to the polymer of which layer B) is made, preferably in form of a master batch containing 30 to 50% by weight of pigments. Layer B) can also be composed of up to 30% by weight of recycled inventive multilayer film material.

The multilayer film according to the invention is preferably produced by the usual blown film coextrusion or cast film coextrusion processes as far as the production of the sequence of layers C) to G) is concerned and preferably by an extrusion lamination step for combining with the polyolefin foam layer A). Thereby the foam layer A) and the multilayer film consisting of layers C) to G) are guided together in such a way that layer B) is extruded between them. Immediately after the extrusion a sufficiently high pressure is applied to the so produced laminate, so that layers A) to G) are sufficiently bonded to one another.

However it is also possible to produce the inventive multilayer films by coextrusion, whereby the foam layer A) is simultaneously coextruded with the other layers, optionally without layer C), and by expanding layer A).

The inventive multilayer films have an excellent thermoformability on so called FFS-machines (form-fill and sealing machines) and thus can be formed to packaging items preferable to trays by deep drawing. These trays can also be filled and sealed on the same machine. It was surprising to find out that the multilayer films according to the present invention cannot only be excellently processed on these FFS-machines but can also be formed to packaging items, particularly deep drawn trays with a higher speed when compared to known multilayer packaging materials.

The inventive multilayer films show an unexpected improvement of the mechanical properties such as resistance to breaking and stiffness of the E-modulus, although their total thickness is reduced compared to known comparable packaging materials. This considerable improvement is achieved without any increase of the thickness of the multilayer films which is being required as for the films known from the prior art. Surprisingly the mechanical properties are even improved although the total thickness of the multilayer packaging material is reduced.

A further object of the invention is therefore the use of the multilayer film according to the present invention as packaging material, preferably on form-, fill- and sealing machines (FFS-machines) for packaging of food, especially for packaging of perishable food such as meat, ham or sliced meat. Because packaging on FFS-machines is very often carried out discontinuously in order to pack differnt goods, the packaging material must show a relatively broad so called thermoforming window in which the thermo-forming of the film can occur. This is achieved by providing the inventive packaging material, which has excellent thermoformability, especially deep drawing qualities.

The thermo-formed, preferably deep-drawn, packaging items, such as, e.g., deep drawn trays, which can be produced from the multilayer materials according to the present invention can be sealed with known lidding film after they have been filled. Suitable lidding films are multilayer films, preferably from polyethylene terephthalate/$SiO_x$/adhesive layer/low density polyethylene or from polyethylene terephthalate/adhesive layer/polyethylene/adhesive layer/ethylene vinyl alcohol copolymer/adhesivel layer/polyethylene.

Of the above mentioned lidding films, the first-mentioned multilayer films are particularly suitable. Therefore the biaxially oriented polyethylene terephthalate is coated with $SiO_x$ by plasma vacuo technique. In a following step the prefabricated polyethylene film is laminated thereto with an adhesive. Such a lidding film is characterized by a excellent transparency and a high breaking resistance. The packaging items having such a lidding film show an excellent gas barrier property.

In the following examples the E-modulus is determined according to DIN 43457 in the machine direction and transverse to this direction. Furthermore he elongation at break in the machine direction and transverse thereto is determined according to DIN 53455.

EXAMPLES

Example 1

An inventive multilayer film is produced with the following sequence of layers:

Layer A) Foam layer with a density of 0.3 g/cm³ and a cell count of 120 cells per mm³ made of a 50:50 wt % mixture of a polypropylene with long chain branching (high melt strength polypropylene) and a heterophasic propylene ethylene blockcopolymer, Layer B) consists of 100% by weight of heterophasic propylene ethylene block copolymer like the one used for foam layer layer A), Layer C) consists of polypropylene, Layer D) consists of an an adhesive based on polypropylene grafted with maleic acid anhydride, Layer E) as a gas barrier layer consisting of an ethylene vinylalcohol copolymer, Layer F) as adhesive layer having the same composition as Layer D), Layer G) as a sealing layer based on low density polyethylene.

The multilayer film is produced by co-extrusion.

The thickness of the individual layers are set forth in table 1.

Table 1:

TABLE 1

| Layer | A) | B) | C) | D) | E) | F) | G) | Total |
|---|---|---|---|---|---|---|---|---|
| Thickness in μm | 800 | 160 | 15 | 5 | 5 | 5 | 20 | 1010 |

The mechanical properties of said fim are set forth in table 3.

Comparative Example

A multilayer film having an identical layer sequence as well as identical layer compositions, but different thicknesses of layers is produced corresponding to the multilayer-film according to example 1.

The thickness of the individual layers of this multilayer film is set forth in table 2:

Table 2:

TABLE 2

| Layer | A) | B) | C) | D) | E) | F) | G) | Total |
|---|---|---|---|---|---|---|---|---|
| Thickness in μm | 1160 | 40 | 15 | 5 | 5 | 5 | 20 | 1250 |

The mechanical properties of this multilayer film are set forth in table 3:

Table 3:

TABLE 3

| | unit | ex. 1 | comp. ex |
|---|---|---|---|
| E-modulus (machine direction) | N/mm$^2$ | 788 | 564 |
| E-modulus (transverse direction) | N/mm$^2$ | 584 | 426 |
| Elongation at break (machine direction) | N/mm$^2$ | 10.2 | 6.9 |
| Elongation at break (transverse direction) | N/mm$^2$ | 8.4 | 5.6 |

As can be seen from table 3, the inventive multilayer films have far superior mechanical values, even though the total thickness of the film is less than of the known packaging materials. Therefore the inventive multilayer films are by far superior for the production of self-supporting packaging, particularly deep drawn trays.

The invention claimed is:

1. A multilayer film comprising the following sequence of layers:
    A) a base layer of foamed propylene homopolymers, copolymer or mixtures thereof,
    B) a layer comprising at least one of the propylene homopolymers or copolymers of the foam layer A,
    C) optionally a tie layer based on a polyolefin
    D) optionally an adhesive layer
    E) optionally a gas barrier layer, a flavortight barrier layer, or both,
    F) an adhesive layer,
    G) an optionally sealable or peelable surface layer,
    whereby the total thickness of layers A and B ranges from 0.5 to 2 mm and the thickness of layer B ranges from ⅙ to ½ of the thickness of layer A.

2. A multilayer film according to claim 1, wherein the total thickness of layers A and B ranges from 0.6 to 1.4 mm.

3. A multilayer film according to claim 1 wherein the thickness of layer B ranges from ⅙ to ⅓ of the thickness of layer A.

4. A multilayer film according to claim 1, wherein layer A is made of a foamed mixture of polypropylene with long chain branching and a propylene-ethylene-blockcopolymer.

5. A multilayer film according to claim 1, wherein layer B is made of polypropylene or a propylene-ethylene-copolymer.

6. A multilayer film according to claim 1, wherein layer C is made of a polyolefin based on a monomer which is present in a predominant amount in the polyolefins of foam layer A.

7. A multilayer film according to claim 6, wherein the polyolefin is polypropylene.

8. A multilayer film according to claim 1, wherein layer E is present and is made of ethylene-vinylalcohol copolymer.

9. A multilayer film according to claim 1, wherein layer G is made of a sealable polymer and optionally contains additives.

10. A multilayer film according to claim 9, wherein layer G is made of a low density polyethylene or an ionomer.

11. A multilayer film according to claim 1, wherein layer G is made of a peelable polymer and optionally contains additives.

12. A multilayer film according to claim 11, wherein layer G is made of a mixture of low density polyethylene and a polybutylene.

13. A multilayer film according to claim 1, wherein the total thickness of layers C to G ranges from 20 to 70 μm.

14. A multilayer film according to claim 13, wherein the total thickness is 30 to 50 μm.

15. A packaging material comprising the multilayer film of claim 1.

16. A packaging item made of a film according to claim 1.

17. A packaging item according to claim 16, wherein said packaging item is a packaging tray.

18. A method for packaging meat, sausage or cheese which comprises packaging said meat, sausage or cheese in a multilayer film according to claim 1.

19. A method of packaging material on form-, fill- and sealing packaging machines which comprises packaging said material in a film of claim 1.

20. A food packaging container which comprises the multilayer film of claim 1.

* * * * *

UNITED STATES PATENT AND TRADEMARK OFFICE
CERTIFICATE OF CORRECTION

| | | |
|---|---|---|
| PATENT NO. | : 7,070,852 B1 | Page 1 of 1 |
| APPLICATION NO. | : 09/763679 | |
| DATED | : July 4, 2006 | |
| INVENTOR(S) | : Reiners et al. | |

It is certified that error appears in the above-identified patent and that said Letters Patent is hereby corrected as shown below:

Column 4, Line 56, "Furthermore he elongation" should read -- Furthermore the elongation --

Column 5, Line 27, "properties of said fim" should read -- properties of said film --

Signed and Sealed this

Eighteenth Day of March, 2008

JON W. DUDAS
*Director of the United States Patent and Trademark Office*